3,375,305
PROCESS FOR SELF-TRANSESTERIFICATION
OF PHOSPHATE POLYOLS
John T. Patton, Jr., and Robert J. Hartman, Wyandotte,
Mich., assignors to Wyandotte Chemicals Corporation,
Wyandotte, Mich., a corporation of Michigan
No Drawing. Filed Sept. 25, 1964, Ser. No. 399,398
10 Claims. (Cl. 260—982)

ABSTRACT OF THE DISCLOSURE

Polymeric phosphate esters are prepared by the self-transesterification of a phosphate polyol in the presence of a ferrous metal catalyst.

---

This invention relates to the production of organic compounds of phosphorus and, more particularly, the production of polymeric phosphate esters.

It is the purpose of this invention to provide an improved process of preparing polymeric phosphate esters and to produce novel polymeric phosphate esters.

It has now been found that this and other purposes can be attained by the self-transesterification of a phosphate polyol in the presence of a ferrous metal catalyst, whereby a polymeric phosphate ester is formed with the elimination of a glycol. The word "glycol," as used herein, includes monomeric and polymeric glycols. The expression "polymeric phosphate ester," as used herein, includes dimeric, trimeric and higher phosphate ester polymers. The phosphate polyol is the reaction product of an acid of phosphorus with an alkylene oxide. The expression "alkylene oxide," as employed herein, includes halogenated or halogen-substituted alkylene oxides. The preparation of phosphate polyols by the reaction of orthophosphoric and phosphorous acids with alkylene oxides is disclosed in U.S. Patent No. 2,372,244. With the process described by said patent, an alkylene oxide is added to the acid at a temperature ranging from about −20 to 150° C. U.S. Patent No. 3,094,549, discloses an improvement in the foregoing process which comprises carrying out the reaction in an inert solvent. With this latter process, the alkylene oxide is added to the acid of phosphorus in an inert solvent medium. The reaction of a vicinal epoxide with a polyphosphoric acid is disclosed in U.S. Patent No. 3,099,676. In copending U.S. patent application, Ser. No. 297,655, now U.S. Patent No. 3,317,638, reaction of an acid of phosphorus with an alkylene oxide is described wherein the reaction product contains long oxyalkylene chains, i.e., the product contains an average of more than 2 oxyalkylene or reacted epoxy groups per OH group of the acid. The phosphate polyol is preferably the reaction product of from about 6 to 150 mols of an alkylene oxide per mol of an acid of phosphorus.

The alkylene oxides useful in the preparation of the phosphate polyol contain the oxirane ring. Suitable alkylene oxides include propylene oxide, the isomeric normal butylene oxides, hexylene oxide, octylene oxide, dodecene oxide, methoxy and other alkoxy propylene oxides; styrene oxide and cyclohexene oxide can also be used as well as dioxides or diepoxides illustrated by the diglycidyl ether monomer of Bisphenol A. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxypentane and 3,3,3-trichloropropylene oxide. Mixtures of any of the above alkylene oxides may be employed as well as any single alkylene oxide.

Various acids of phosphorus may be used including 100% phosphoric acid or orthophosphoric acid and phosphorus-containing acids, such as pyrophosphoric acid, polyphosphoric acid and meta phosphoric acid having a $P_2O_5$ equivalency of from about 60 to 90 percent by weight and a water equivalency of from 27.6 to 10 percent by weight. In these mixtures, the phosphorous-containing acids, which may be formed by reaction of the phosphorous pentoxide with water, may exist in polymeric form. Phosphorous acid and partial esters of phosphorous acids such as the mono- and diesters of orthophosphoric acid, the monoesters of phosphorous acid and the mono-, di- and triesters of pyrophosphoric acids such as the symmetrical and unsymmetrical dimethyl acid pyrophosphate and ethyl acid phosphate are also usable in the invention. In addition, phosphonic acids such as chloromethyl phosphonic acid, phenyl phosphonic acid, trichloromethane phosphonic acid, hydroxymethyl phosphonic acid and allyl phosphonic acid and phosphinic acids such as diphenyl phosphinic acid, phenyl phosphinic acid, bis-hydroxymethyl phosphinic acid and methyl phosphinic acid may also be employed.

The method of the invention may be most simply performed by placing the phosphate polyol and the ferrous metal catalyst in a container. The ferrous metal catalyst may be iron or alloys thereof such as steel and stainless steel and may be in the form of filings, chips from machining operations, solid blocks, steel wool, or even a ferrous metal container may be employed as the catalyst.

The concentration of the catalyst for the self-transesterification reaction may vary widely, the greater the amount of catalyst the faster the reaction with the maximum and minimum amounts being guided primarily by economic considerations. Preferably, the catalyst is used in small concentrations with the minimum effective amount being generally about 0.1 percent by weight based on the weight of the phosphate polyol. A practical maximum is about 10 weight percent based on the weight of the phosphate polyol.

The process of this invention can be performed at various pressures up to 1 atmosphere and from about 1 mm. of mercury up to about 0.1 atmosphere is preferred. The temperature of the reaction can vary from 0 to 200° C. and the preferred range is from about 80 to 150° C. The time required for the transesterification reaction may vary from a very short period of time such as 90 minutes to several days depending on the phosphate polyol employed, the concentration of catalyst in the polyol and the temperature and pressure. This process produces products without discoloration or decomposition which range from pourable liquids to extremely viscous, rubbery products. These products are useful as intermediates for urethane compositions, surface active agents, improved flame retardant materials, fuel additives, lubricant additives, plasticizers for synethetic resins, insecticides and many other purposes.

Specific examples ilustrating the practice of this invention are set forth below.

Example 1

200 grams of a light, clear liquid phosphate polyol and 2 grams of steel wool were charged in a 300 ml. round bottom flask equipped with a nitrogen bubbler, thermometer and distillation head. The phosphate polyol had a molecular weight of 520, a hydroxyl number of 324, contained 6.20 weight percent of phosphorus and was the reaction product of 490 parts by weight of commercial 100% phosphoric acid and 2300 parts by weight of ethylene oxide. The reaction mixture was then heated for 8 hours at 150° C. and 1 millimeter of mercury pressure in a nitrogen atmosphere. During the reaction period, 28.1 grams of a glycol material distilled off and the reaction mixture became viscous. The product had a hydroxyl number of 194 and contained 6.72 weight percent of phosphorus. The increase in viscosity, the decrease in hydroxyl number and the increase in percent phosphorus demonstrated that polymerization by self-transesterification took place.

Example 2

200 grams of a light, clear liquid phosphate polyol and 2 grams of steel wool were charged to a 300 ml. round bottom flask equipped with a nitrogen bubbler, thermometer and distillation head. The phosphate polyol had a molecular weight of 487, a hydroxyl number of 346, contained 6.37 weight percent of phosphorus and was the reaction product of 490 parts by weight of commercial 100% phosphoric acid and 2300 parts by weight of epichlorohydrin. The reaction mixture was then heated for 8 hours at 150° C. and 10 millimeters of mercury pressure in a nitrogen atmosphere. During the reaction period, 20.4 grams of a glycol material distilled off and the reaction mixture became extremely viscous. The product had a hydroxyl number of 247 and contained 5.72 weight percent of phosphorus. The increase in viscosity, the decrease in hydroxyl number, and the increase in percent phosphorus demonstrated that polymerization by self-transesterification took place.

Example 3

200 grams of a light, clear liquid phosphate polyol and 2 grams of steel wool were charged to a 300 ml. round bottom flask equipped with a nitrogen bubbler, thermometer and distillation head. The phosphate polyol had a molecular weight of 1070, a hydroxyl number of 285, contained 9.35 weight percent of phosphorus and was the reaction product of 170 parts by weight of propylene oxide and 50 parts by weight of 115% phosphoric acid. The reaction mixture was heated for 6 hours at 150° C. and 10 millimeters of mercury pressure in a nitrogen atmosphere. During the reaction period, 26.3 grams of a glycol material distilled off and the reaction mixture became viscous. The product had a hydroxyl number of 196 and contained 10.7 weight percent of phosphorus. The increase in viscosity, the decrease in hydroxyl number and the increase in percent phosphorus demonstrated that polymerization by self-transesterification took place.

Example 4

200 grams of a light, clear liquid phosphate polyol and 2 grams of steel wool were charged to a 300 ml. round bottom flask equipped with a nitrogen bubbler, thermometer and distillation head. The phosphate polyol had a molecular weight of 562, a hydroxyl number of 299, and was the reaction product of 295 parts by weight of commercial 100% phosphoric acid and 1330 parts by weight of butylene oxide. The reaction mixture was then heated for 8 hours at 150° C. and 1 millimeter of mercury pressure in a nitrogen atmosphere. During the reaction period, the reaction mixture became extremely viscous. The increase in viscosity demonstrated that polymerization by self-transesterification took place.

Example 5

100 grams of a light, clear liquid phosphate polyol and 0.5 grams of steel wool were charged to a 200 ml. round-bottom flask equipped with a nitrogen bubbler, thermometer and distillation head. The phosphate polyol had a hydroxyl number of 351 and was the reaction product of 120 parts by weight of a commercial 100% phosphoric acid and 430 parts by weight of propylene oxide. The reaction mixture was heated for 9 hours at 150° C. and 10 millimeters of mercury pressure in a nitrogen atmosphere. During the reaction period, 20 grams of a glycol material distilled off and the reaction mixture became viscous. The product had a hydroxy number of 208.5 and contained 9.4 weight percent of phosphorus.

By way of comparison a second reaction was attempted using the same procedure conditions and phosphate polyol as above with a single exception that no catalyst was employed. The resulting product was readily pourable and contained 8.9 weight percent of phosphorus. The lower phosphorus content and lower viscosity of the latter product indicated that any transesterification which may have taken place occurred to a substantially lesser degree.

Example 6

This example demonstrates that the ferrous metal catalyst need not be in the form of steel wool but may be employed in another form and that transesterification will occur at ambient temperature and pressure, although generally a longer period of time is required under ambient conditions.

The phosphate polyol described in Example 5 was allowed to stand under ambient conditions in a mild steel test cup. After 15 days the phosphate polyol began to gel along the surface of the steel cup. After 30 days' standing, the phosphate polyol became extremely viscous, thereby demonstrating that polymerization by self-transesterification took place. A sample of the same phosphate polyol was placed in a glass container and stored under the same conditions as above but in the absence of any ferrous metal. The material did not change in viscosity over a period of time as long as 6 months and thus it can be seen that no noticeable transesterification took place.

Example 7

50 grams of the phosphate polyol, described in Example 5, and 0.5 gram of steel wool were charged to a 100 ml. round-bottom flask equipped with a nitrogen bubbler, thermometer and distillation head. The reaction mixture was then heated for 8 hours at 100° C. and 0.5 millimeter of mercury, followed by heating for 9 hours at 150° C. and 0.5 millimeter of mercury pressure under a nitrogen atmosphere. During the reaction, 16.4 grams of a glycol material distilled off and the reaction mixture became viscous to form a clear, slightly yellow, jelly-like material.

Transesterification reactions of the above phosphate polyol under the same conditions as above were attempted, wherein aluminum, copper and magnesium were substituted for the steel catalyst. The resultant product was a clear, yellow viscous liquid, thus indicating that the other metals did not catalyze the reaction for self-transesterification as effectively as the steel wool.

Example 8

447 grams of the phosphate polyol, described in Example 5, and 4.5 grams of steel wool were charged to a 1 liter round-bottom flask equipped with a nitrogen bubbler, thermometer and distillation head. The reaction mixture was heated for 9 hours at 150° C. and 1 millimeter of mercury pressure under a nitrogen atmosphere. During the reaction, 153 grams of a glycol material distilled off. The reaction product was an extremely viscous elastomeric material.

It is to be understood that various changes and modifications may be made in the foregoing without departing from the spirit of the invention and scope of the appended claims.

What is claimed is:
1. A process comprising the self-transesterification of a phosphate polyol in the presence of a ferrous metal catalyst in an amount of at least about 0.1 percent by weight of the phosphate polyol, whereby a polymeric phosphate ester is formed with the elimination of a glycol, said phosphate polyol being the reaction product of an acid of phosphorus and an alkylene oxide.

2. The process of claim 1 wherein the transesterification temperature ranges from about 0 to 200° C. and the pressure is not greater than 1 atmosphere.

3. The process of claim 2 wherein the catalyst is steel.

4. The process of claim 2 wherein the catalyst is steel wool.

5. The process of claim 1 wherein said acid of phosphorus has a $P_2O_5$ equivalency of from about 60 to 90 percent by weight and a water equivalency of from about 27.6 to 10 percent by weight.

6. The process of claim 1 wherein said acid of phosphorus is 100% phosphoric acid.

7. The process of claim 1 wherein said alkylene oxide is a halogenated alkylene oxide.

8. The process of claim 1 wherein said alkylene oxide is selected from the group consisting of ethylene oxide, propylene oxide, butylene oxide and epichlorohydrin.

9. The process of claim 1 wherein said alkylene oxide is propylene oxide.

10. A process comprising the self-transesterification of a phosphate polyol in the presence of a ferrous metal catalyst in an amount of from about 0.1 to 10 percent by weight of the phosphate polyol at a temperature in the range of from about 80 to 150° C., and a pressure in the range of from about 1 millimeter of mercury to 0.1 atmosphere, whereby a polymeric phosphate ester is formed with the elimination of a glycol, said phosphate polyol being the reaction product of an acid of phosphorus and an alkylene oxide.

References Cited
UNITED STATES PATENTS 2,909,559  10/1959  Lanham _____ 260—978 X
3,099,676  7/1963  Lanham _____ 260—978 X CHARLES B. PARKER, *Primary Examiner.*

B. BILLIAN, A. H. SUTTO, *Assistant Examiners.*